Feb. 21, 1967   C. P. WILLIS   3,305,155
ESCAPEMENT MECHANISM
Filed March 25, 1965   2 Sheets-Sheet 1
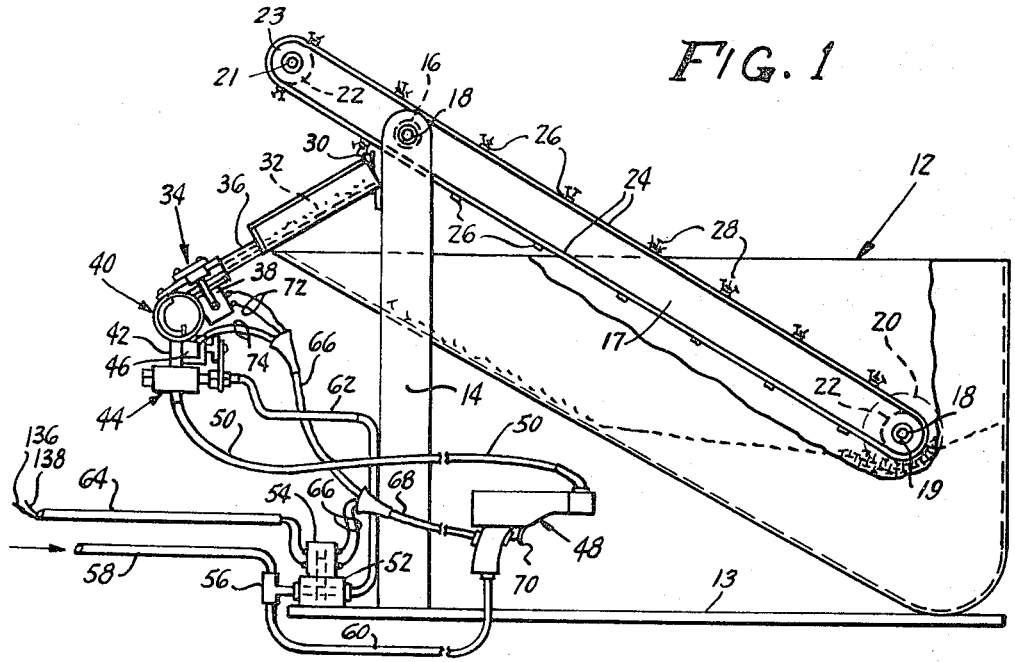
FIG. 1
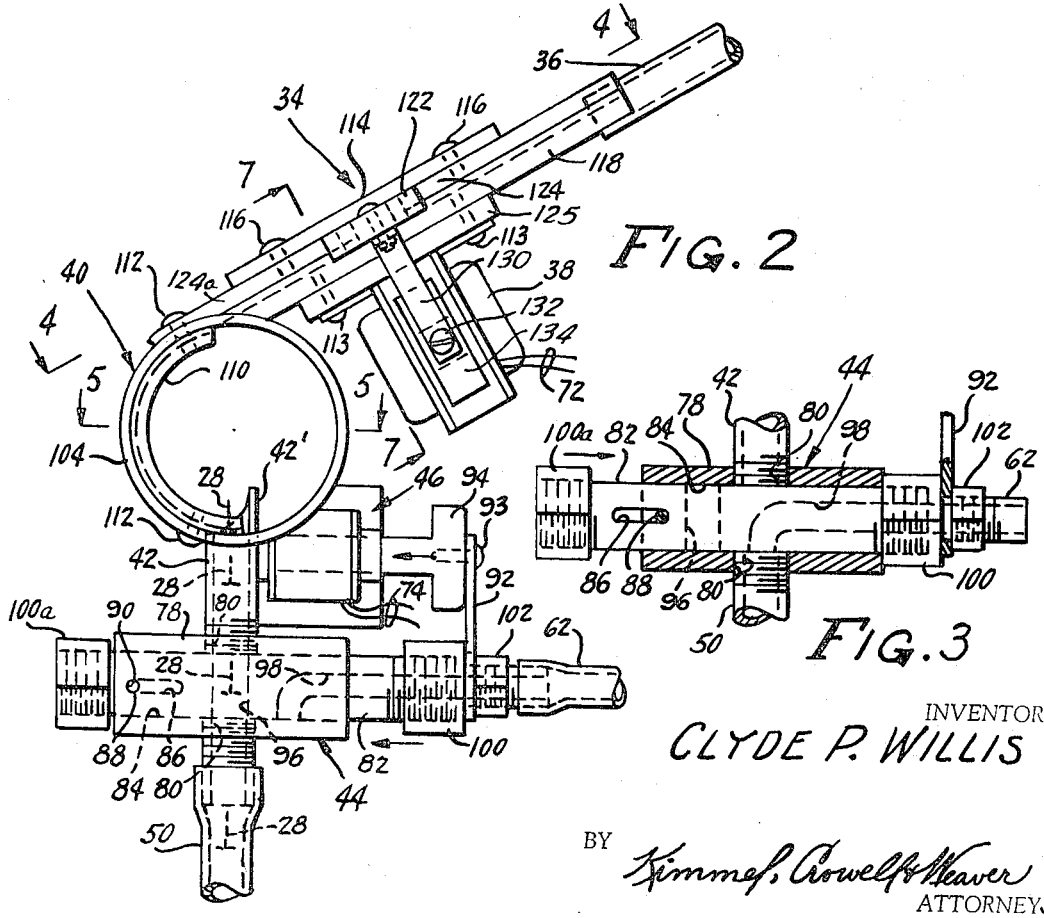
FIG. 2
FIG. 3
INVENTOR.
CLYDE P. WILLIS
BY Kimmel, Crowell & Weaver
ATTORNEYS.

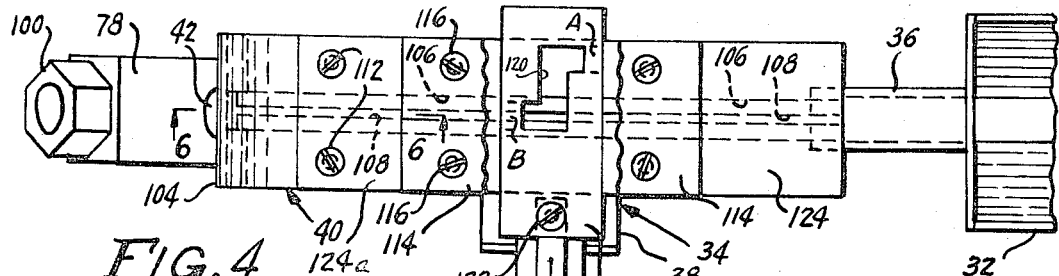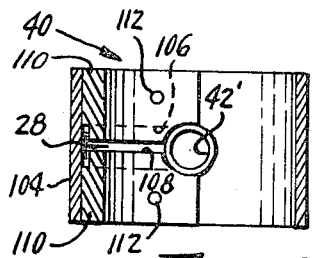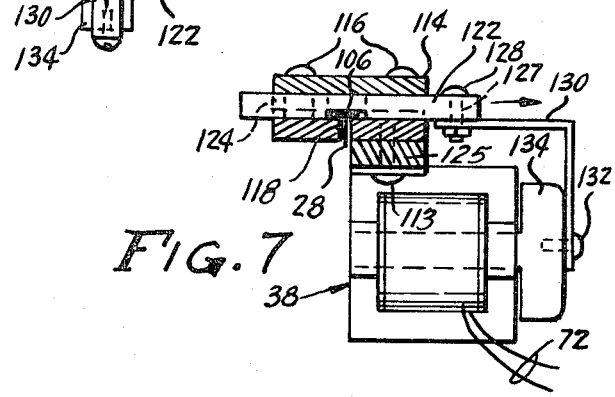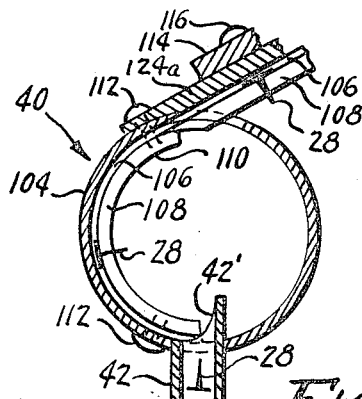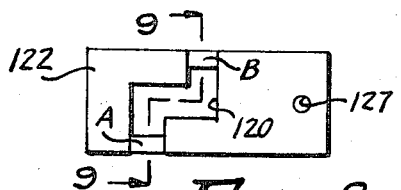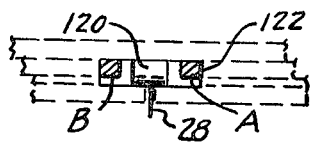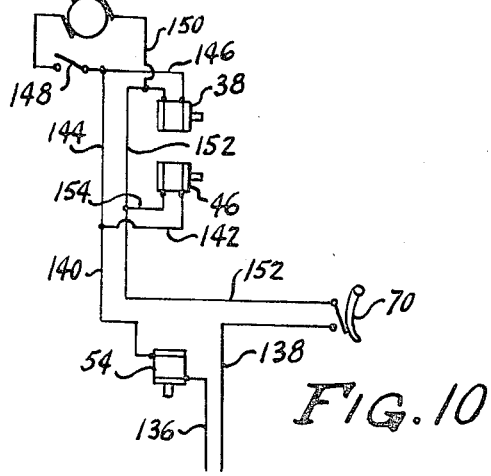

United States Patent Office 3,305,155
Patented Feb. 21, 1967

3,305,155
ESCAPEMENT MECHANISM
Clyde P. Willis, Conover, N.C. 28613
Filed Mar. 25, 1965, Ser. No. 442,712
4 Claims. (Cl. 227—116)

This invention relates to improvements in tools and continuous feeding systems therefor, of the pneumatic driving type used by upholsterers to drive nails, tacks and the like. More particularly, the invention is an improvement over my prior Patent No. 2,994,880 issued August 8, 1961, in which a novel escapement and object positioning mechanisms are used for the proper alignment of driven objects before they enter a pneumatic gun for final driving into a desired material.

The use of magazines with pneumatic driving guns of hammers has created various and sundry problems in periodic magazine refills, as such magazines are restricted in the quantity of tacks or the like they may hold. The instant invention solves the above problems by providing a substantially continuous and uninterrupted supply of tacks or similar articles for the pneumatic driving hammer or gun, the gun being modified and improved for such continuous use without normally requiring servicing of the pneumatic hammer during a days use by an upholsterer or similar tradesman. This invention thus saves labor, time and additional cost of packaging refill tacks, nails and the like in small quantities in the form of magazines by providing a substantially continuous supply of such objects.

A primary object of this invention is to provide an improved electrically controlled pneumatically powered continuous feeding system for tacks, nails or the like through a novel sliding escapement cooperating with an arcuate positioning conduit for selectively feeding driven objects to a pneumatically powered driving device.

An additional important object of this invention is to provide an electrically controlled pneumatic tack feeder system which will successfully feed tacks or other similar objects to be driven for long periods of time from a supply bin or the like into the path of travel of a pneumatically operated driving hammer or gun comprised of a plunger rod and barrel which selectively and successively positions and drives such objects.

Another object of the invention is to provide a pneumatic tack hammer mechanism of the class described, which may be held at any particular location of a work area to drive a tack or nail into material by a pneumatically operated hammer rod and feeder barrel mechanism controlled by the movement of trigger, thereby insuring the proper positioning of the tacks passing through the barrel mechanism preparatory to being driven into a work material by the tack hammer mechanism.

A further object of the invention is to provide a tool of the above character, which is supplied with a handle grip of pistol like form so that the driving hammer and feeding mechanism may be conveniently handled and manipulated with a minimum amount of effort on the part of the operator.

A still further object of the invention is to provide a pneumatically operated gun wherein the hammer will be moved to actuate an electrical control circuit to operate pneumatically the nail escape and dispensing mechanisms prior to actuating the hammer rod to drive a tack into a desired work material.

Another object of the invention is to provide a magnetic conveyor including a brush for removing tacks therefrom, and gate mechanism cooperating therewith to dispense tacks or nails through an arcuate positioning conduit for feeding a substantially continuous supply of tacks into a pneumatic tack gun or hammer.

Another object of the invention is to provide an upholsterer's pneumatic tack or nail hammer and continuous nail feeder system combination which is simple to operate, easy to service and adapted to use various sizes and lengths of nails.

A further object of the invention is to provide an electrical circuit for correlation of the operations of the pneumatic system with solenoid operated mechanisms to control operation of the automatic tack or nail driving hammer.

Still other objects of the invention reside in the combinations of elements, arrangements of parts, and features of construction, all as will be more fully pointed out hereinafter and disclosed in the accompanying drawings wherein:

FIGURE 1 is an elevational view of the assembly of one form of escape mechanism embodying features of the instant invention, incorporated into the improved pneumatic and electrically controlled nail feeder system of the present invention;

FIGURE 2 is an enlarged elevational view showing the nail escape mechanism, arcuate nail positioning mechanism, actuating solenoids, supply lines for introducing the nails to the escape mechanism, and compressed air supply connections and the like;

FIGURE 3 is a sectional view of the pneumatic gating mechanism of the invention taken as shown in full lines in FIGURE 2, in a different position of adjustment;

FIGURE 4 is an enlarged plan view of the new object escapement mechanism, taken substantially on lines 4—4 of FIGURE 2, looking in the direction of the arrows;

FIGURE 5 is a sectional view of the object positioning mechanism of the invention taken on line 5—5 of FIGURE 2, looking in the direction of the arrows;

FIGURE 6 is a sectional view of the object positioning mechanism taken substantially on lines 6—6 of FIGURE 4, looking in the direction of the arrows;

FIGURE 7 is an enlarged partial sectional view, partially in elevation, of the slider mechanism of the escape mechanism in association with its actuating solenoid means of the instant invention, taken substantially on lines 7—7 of FIGURE 2 looking in the direction of the arrows;

FIGURE 8 is a plan view of the movable slotted plate means of the object escape mechanism;

FIGURE 9 is a sectional view of FIGURE 8, taken substantially on lines 9—9, looking in the direction of the arrows; and FIGURE 10 is a schematic circuit diagram showing the energizing circuit for the motor and solenoids of the invention selectively actuated by a trigger switch means.

Similar reference characters refer to similar parts throughout the several views of the drawings.

Referring now to the drawings in detail, and more particularly to FIGURE 1, the electrically controlled pneumatic system in combination with a pneumatic hammer of the instant invention, comprises, in general, a hopper 12 for nails or tacks, carried by a base 13, from which vertical support means 14 extend upwardly, bearings 16 pivotally supporting a shaft 18 at the upper end of support means 14, shaft 18 in turn carrying an inclined conveyor belt support 17, having belt roller supporting shafts 19 and 21 at either end thereof. Shafts 19 and 21 in turn carry rollers 22 and 23 which carry an endless conveyor belt 24 which is provided at spaced intervals with magnetic cleats 26 to attrack nails or tacks 28. An electric motor 20 connected to shaft 19 drives belt 24. A tack receiving trough 32 is positioned adjacent the upper end of belt 24 and receives tacks brushed from cleats 26 by a brush 30 and carries them by gravity through a slotted conduit 36 to an escapement mechanism 34, operated by a solenoid 38, all as will be more fully described hereinafter.

Escapement mechanism 34 selectively allows escapement of nails 28 from the conduit 36 into arcuate positioning conduit means 40 which communicates by conduit 42 with valved gate mechanism 44, selectively operated by energized solenoid 46, all as will be more fully described hereinafter.

Gate mechanism 44 communicates with nail or tack hammer gun 48 by conduit 50, selectively dispensing nail like objects through conduit 50 by a blast of a compressed air to gun 48, as hereinafter described.

Solenoid actuated compressed air supply valve 52 is selectively operated by solenoid 54. Valve 52 is connected by T 56 to compressed air supply line 58 which is connected to a conventional compressed air supply, not shown. T 56 also supplies compressed air through conduit 60 to gun 48. Valve 52 selectively supplies compressed air through conduit 62 to valved gate mechanism 44 operated by solenoid 46, as hereinafter described.

An electrical supply cable 64 extends from a conventional power supply to solenoid 54 and is connected by cable 66 to cable 68 which is in turn connected to trigger switch 70 of gun 48. Electric cable 66 is also connected by electric cables 72 and 74 to solenoids 38 and 36, respectively as hereinafter explained in connection with FIGURE 10.

Gun 48 may be of the type used in applicant's U.S. patent application, Serial No. 342,963, filed February 6, 1964, or other similar type, as desired.

Referring to FIGURES 2 and 3, valved gate mechanism 44 comprises an outer body member 78 having transverse apertures 80 therein communicating with conduits 42 and 50, and an inner apertured valve member 82 reciprocably mounted in a longitudinal bore 84 of body member 78. Valve member 82 contains a slot 86 therein which reciprocably coacts with a pin 88 inserted in an aperture 90 of body member 78. Pin 88 serves as a guide means and limits the reciprocal travel of valve member 82 as actuated by a linkage 92 connected by a screw 93 to an armature 94 of solenoid 46. Valve member 82 contains an aperture 96 which communicates by apertures 80 of body member 78 with conduits 42 and 50 to allow a tack or nail to pass therethrough when member 82 is in the position shown in FIGURE 2. Valve member 82 has a substantially L-shaped bore 98 therein which communicates with compressed air hose 62, as shown in FIGURES 1, 2 and 3, to follow a dispensed nail-like object with a blast of compressed air to propel a nail 28 to gun 48 through conduit 50. Nuts 100a serve as adjustment and abutting nuts on valve member 82, and lock nut 102 serves as a means to secure linkage 92 to valve member 82.

Referring to FIGURES 2, 4, 5 and 6, nail or tack positioning arcuate conduit means 40 comprises an arcuate outer body member 104 secured to a conduit 106 having a slot 108 therein connected to escapement mechanism 34. An inner member 110 forms, in cooperation with member 104, slotted conduit 106 and is secured to member 104 by screw bolt means 112, as best shown in FIGURES 4 and 6. The space between members 104 and 106 may be adjusted for different size nails or tacks 28. At the lower end of slotted conduit 106 an abutment 111 stops each nail or tack 28 and directs it in head forward relation into the open upper end of conduit 42.

Referring to FIGURES 2, 4, 7, 8 and 9, the escapement mechanism 34 comprises a top plate 114 secured by screw bolts 116 to a slotted lower plate 118 secured by screw means 113 to the under side of conduit 36. Screws 113 also mount solenoid 38 and mounting block 125 to the escapement mechanism structure. Slotted conduit 106 is intercepted by a transverse slot 120 of substantially Z-shape in a slidable guide member 122 reciprocably mounted in guide members 124 and 124a. Guide member 122 is secured by a bolt means 128 extending through an aperture 127 to an L-shaped linkage member 130 secured by screw bolt 132 to the armature 134 of solenoid 38, as best shown in FIGURE 7. Slot 120 in slidable member 122 has an entrance for the heads of nails or tacks 28 as shown in dotted lines at point A, and an exit at point B, shown in dotted lines, in FIGURE 4, as also shown in full lines in FIGURES 8 and 9.

The schematic diagram of FIGURE 10 shows the electrical circuit of the invention. A series circuit from line 136, to a power source, through solenoid 54, lines 140, 144 and 146, through solenoid 38, line 152 and to the return line 138 to the power is completed upon the closing of trigger switch 70. Closure of trigger switch 70 also energizes solenoid 46 through lines 142 and 154. With trigger switch 70 closed, a circuit through motor 20 may be completed through switch 148 and line 150. Switch 148 may be of any desired type such as the commonly used toggle switch, push button switch, pedal switch, or any convenient kind and may be conveniently located. In operation, switch 148 may be closed and motor 20 operated by the closing of trigger switch 70, or, if desired, switch 148 may be periodically closed while switch 70 is held in the closed position during use of the gun 48.

OPERATION

To operate the electrically controlled pneumatic system of this invention, switch 70, of FIGURE 10, is closed to operate solenoids 38, 46 and 54. Motor 20, which operates conveyor belt 24 of FIGURE 1 is turned as required to supply nails or tacks 28 to conduit means 32 and 36 for admission by reciprocating slide gate 122 of escape mechanism 34 to nail positioning conduit means 40 which in turn admits nails 28 having their heads forward for entrance through gate mechanism 44, when the apertures are open for passing of the nails therethrough. As a nail passes through gate 44, solenoid 46 reciprocates valve member 84 to dispense a blast of compressed air through conduit 50 to propel nails 28 to gun 48. Before nail 28 enters gun 48 it passes over positioning means as described in my previously mentioned co-pending application, to place the sharp end of the nail forwardly in gun 48 for being driven into a work piece when trigger 70 is depressed to admit compressed air from conduit 60 to pneumatically operate the gun to drive the nail in accordance with the teachings of the gun in applicant's above patent application.

Thus as the trigger is pressed to drive a tack, an additional tack is advanced through the escapement mechanism and another tack is advanced to the gun 48 by air valve 44. Simultaneously conveyor belt 24 is advanced, if switch 148 is closed, to supply tacks as necessary to trough or conduit 36, thus insuring a steady and continuous flow of properly positioned tacks from hopper 12 to gun 48.

One of the points of novelty of this invention resides in applicant's new solenoid actuated tack dispensing and air dispensing valve 44.

Another point of novelty of the invention resides in applicant's new nail escapement mechansm 34 which only allows one nail or tack 28 to be passed at a time through the system to prevent clogging thereof.

Another point of novelty of the invention is applicant's method of positioning the heads of nail or tack means 28 forward during passage through a flexible conduit to prevent the sharp point of nail 28 from impinging in or penetrating the walls of the conduit to prevent clogging of the nails 28 in the conduit, and lastly the repositioning of nail 28 sharp point forward by positioning conduit means before entry of the nail into gun 48 for driving nail 28 into a work piece.

From the foregoing it will be now seen that there is herein provided a new and improved pneumatic tack hammer device and continuous nail or tack feeder system which accomplishes all the objects of this invention, and others, including many advantages of great practical utility and commercial importance.

It is to be understood, of course, that the foregoing disclosure is a preferred embodiment of the instant invention, that various modifications and changes may be made in the invention by those skilled in the art without departing from the spirit and scope of the invention as set forth in the appended claims.

I claim:
1. A nail driving apparatus comprising:
a hopper for containing nails;
a conveyor belt, one end of which extends into the hopper;
magnetic cleats on the belt for attracting nails;
means for driving the belt;
a conduit at the other end of the belt for receiving nails;
means adjacent the other end of the belt for removing nails from the magnetic cleats for deposit in the nail receiving conduit;
an escapement mechanism connected to the nail receiving conduit, said mechanism including
    a fixed plate having a slot for guiding the nails,
    a movable plate adjacent the fixed plate, said movable plate having an irregular slot in selective alignment with the slot in the fixed plate to selectively permit nails individually to pass through the escapement mechanism, and means for actuating the escapement mechanism;
a nail inverter connected to the escapement mechanism;
a nail driving gun;
a conduit interconnecting the nail inverter and the nail driving gun;
a valve in the conduit, for selectively connecting a source of compressed air to the conduit;
means for connecting the valve to the source of compressed air;
means for controlling the valve;
means connecting the gun to the source of compressed air;
a trigger on the gun for actuating the gun including an electrical switch;
circuit means including the switch for actuating the belt driving means, the valve controlling means, and the escapement mechanism actuating means when the switch is closed to advance the conveyor belt, pass a nail through escapement mechanism and propel the nail to the gun.

2. The structure of claim 1 wherein a second switch is interposed in said circuit to connect and disconnect said motor.

3. The structure of claim 1 wherein the slot in said movable plate is substantially Z-shaped, having a nail entrance and an offset nail exit whereby a nail is admitted from said nail receiving conduit when said first actuating means is deenergized, and permitted to pass to said nail inverter when said actuating means is energized to move said movable plate.

4. The structure of claim 1 wherein said valve for connecting said source of compressed air includes, a valve body, a reciprocable valve member linearly movable in said body, a nail passage extending through said valve member, a compressed air passage in said valve member separated from said nail passage, said body having an opening into said nail feeding conduit, said nail passage being aligned with said opening when said valve controlling means is deactuated, and said nail passage being disaligned and said compressed air passage being aligned with said opening when said valve controlling means is actuated.

References Cited by the Examiner

UNITED STATES PATENTS

| | | |
|---|---|---|
| 451,349 | 4/1891 | Webster _____ 227—113 X |
| 1,703,458 | 2/1929 | Ruff _____ 227—112 |
| 1,839,176 | 12/1931 | Pierce _____ 227—116 |
| 2,273,268 | 2/1942 | Hunter et al. _____ 227—112 |
| 2,534,140 | 12/1950 | Moore _____ 227—112 X |
| 2,708,022 | 5/1955 | Pettigrew. |
| 2,794,980 | 6/1957 | Reilly et al. _____ 227—116 |
| 2,850,736 | 9/1958 | Houghton _____ 227—112 |
| 2,879,509 | 3/1959 | Congdon et al. _____ 227—112 |
| 3,041,617 | 7/1962 | Parr _____ 227—116 |

GRANVILLE Y. CUSTER, Jr., *Primary Examiner.*